(12) United States Patent
Osterland et al.

(10) Patent No.: US 6,928,705 B2
(45) Date of Patent: Aug. 16, 2005

(54) LOW INSERTION EFFORT U-BASE RETAINER

(75) Inventors: Robert Williams Osterland, St. Clair, MI (US); Jeff A. Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 205 days.

(21) Appl. No.: 10/628,742

(22) Filed: Jul. 28, 2003

(65) Prior Publication Data

US 2004/0016087 A1 Jan. 29, 2004

Related U.S. Application Data

(63) Continuation of application No. PCT/US02/06753, filed on Mar. 4, 2002.
(60) Provisional application No. 60/272,992, filed on Mar. 2, 2001.

(51) Int. Cl.[7] ............... A44B 21/00; F16B 21/00
(52) U.S. Cl. ............... 24/295; 24/289; 24/293; 24/458; 411/508
(58) Field of Search ............... 24/295, 289, 293, 24/458; 411/508

(56) References Cited

U.S. PATENT DOCUMENTS

| | | |
|---|---|---|
| 2,574,330 A | 11/1951 | Judd |
| 3,703,120 A | 11/1972 | Van Buren, Jr. |
| 3,830,134 A | 8/1974 | Erickson |
| 3,869,958 A | 3/1975 | Murayama |
| 4,043,579 A | 8/1977 | Meyer |
| 4,300,865 A | 11/1981 | Murray |
| 4,312,614 A | 1/1982 | Palmer et al. |
| 4,402,118 A | 9/1983 | Benedetti |
| 4,595,325 A | 6/1986 | Moran et al. |
| 4,644,612 A | 2/1987 | Osterland |

(Continued)

FOREIGN PATENT DOCUMENTS

| | | |
|---|---|---|
| DE | 3822463 C1 | 9/1989 |
| DE | 4416698 A1 | 11/1995 |
| DE | 19626050 A1 | 2/1997 |
| DE | 19640165 A1 | 4/1997 |
| DE | 19702429 A1 | 7/1998 |
| DE | 20004580 U1 | 8/2000 |
| DE | 10059522 A1 | 6/2002 |
| EP | 0855523 A1 | 7/1998 |
| JP | 07293521 | 11/1995 |
| JP | 08121441 | 5/1996 |
| WO | WO 00/40866 | 7/2000 |
| WO | WO 02/44570 A1 | 6/2002 |

*Primary Examiner*—Victor Sakran
(74) *Attorney, Agent, or Firm*—Harness, Dickey & Pierce, P.L.C.

(57) ABSTRACT

A resilient clip for engaging a structure and having a body portion (22) with a pair of top flanges (24), a pair of fastening fingers (26) and a pair of abutting coupling flanges (28). Each of the fastening fingers (26) are coupled to the body portion (22) that is coupled to an associated top flange (24). Each of the abutting flanges (26) has a concave surface, which engages the mounting structure. The fastening finger (26) portions are configured to engage a first side of a mounting flange on an interior trim component.

20 Claims, 12 Drawing Sheets

U.S. PATENT DOCUMENTS

| | | |
|---|---|---|
| 4,787,795 A | 11/1988 | Kraus |
| 4,865,505 A | 9/1989 | Okada |
| 4,925,351 A | 5/1990 | Fisher |
| 5,035,661 A | 7/1991 | Steinhardt et al. |
| 5,448,809 A | 9/1995 | Kraus |
| 5,651,562 A | 7/1997 | Hagen et al. |
| 5,774,949 A | 7/1998 | Cornell et al. |
| 5,797,714 A | 8/1998 | Oddenino |
| 5,803,532 A | 9/1998 | Karuppaswamy et al. |
| 5,829,934 A | 11/1998 | Danby et al. |
| 5,987,714 A | 11/1999 | Smith |
| 6,074,150 A | 6/2000 | Shinozaki et al. |
| 6,095,734 A | 8/2000 | Postadan et al. |
| 6,141,837 A | 11/2000 | Wisniewski |
| 6,145,870 A | 11/2000 | Devane et al. |
| 6,154,933 A | 12/2000 | Vetter et al. |
| 6,209,178 B1 | 4/2001 | Wiese et al. |
| 6,279,207 B1 | 8/2001 | Vassiliou |
| 6,315,510 B1 | 11/2001 | Sturies et al. |
| 6,317,937 B1 | 11/2001 | Ishihara et al. |
| 6,320,134 B1 | 11/2001 | Rehberg et al. |
| 6,353,981 B1 | 3/2002 | Smith |
| 6,381,811 B2 | 5/2002 | Smith et al. |
| 6,406,242 B1 | 6/2002 | Gordon |
| 6,449,814 B1 | 9/2002 | Dinsmore et al. |
| 6,474,921 B1 | 11/2002 | Gordon |
| 6,497,011 B2 | 12/2002 | Smith et al. |
| 6,527,471 B2 | 3/2003 | Smith et al. |
| 2002/0001502 A1 | 1/2002 | Smith et al. |
| 2002/0017009 A1 | 2/2002 | Smith et al. |
| 2002/0064435 A1 | 5/2002 | Sbongk |
| 2002/0104201 A1 | 8/2002 | Smith et al. |
| 2002/0194710 A1 | 12/2002 | Dickinson et al. |
| 2003/0024077 A1 | 2/2003 | Vassiliou |
| 2003/0024078 A1 | 2/2003 | Vassiliou |

FIGURE 3B
SECTION A A

FIGURE 3C
SECTION B B

FIGURE 5A

FIGURE 5B
SECTION C C

FIGURE 5C
SECTION D D

FIGURE 14B
SECTION A A

FIGURE 14C
SECTION B B

FIGURE 15A

FIGURE 15B
SECTION C C

FIGURE 15C
SECTION D D

LOW INSERTION EFFORT U-BASE RETAINER

CROSS-REFERENCES TO RELATED APPLICATION

This application is a continuation of International Application No. PCT/US02/06753 Mar. 4, 2002 and published on Sep. 12, 2002 under International Publication No. WO 02/070905, which claims priority to Provisional U.S. Patent Application Ser. No. 60/272,992 which was filed Mar. 2, 2001.

TECHNICAL FIELD

The present invention relates generally to resilient clip fasteners and more particularly to a resilient clip fastener that employs a particular surface geometry to secure the body portion of the resilient clip to a structure. More specifically, the present invention relates to a resilient clip fastener having a construction that utilizes abutment flanges to permit the clip to be inserted into an aperture with a relatively low insertion force while resisting relatively high withdrawal forces. The invention also relates to a resilient clip fastener having a construction that accounts in several manners for part-to-part variation between the structures that are to be fastened together.

BACKGROUND OF THE INVENTION

Many current vehicles employ resilient clips to secure various components to the vehicle body. One such application concerns interior panels that mount to the interior of the vehicle such as on the doors. Such panels serve not only to provide occupants with a convenient point to grasp during ingress to and egress from the vehicle, but also provide energy absorption during a crash event.

During assembly of the vehicle, it is conventional procedure of the entire panel assembly to be installed onto the interior of the vehicle in a single operation. In other words, the panel assembly is passed through either the windshield or backlight opening of the vehicle body on the assembly line and then the panel assembly is secured by line operators to the interior of the vehicle.

In order to accomplish this assembly task, the panel assembly is typically equipped with numerous fasteners, located around the periphery of the panel assembly as well as at predetermined locations around the interior area of the panel, that are adapted to penetrate through corresponding holes located in the reinforcing sheet metal members of the vehicle interior. It is the responsibility of the line operators to properly orient the panel assembly adjacent the interior of the vehicle and press the fasteners into the various mounting holes in the reinforcing sheet metal members to secure the panel assembly to the interior of the vehicle.

For aesthetic reasons, the panel fasteners are typically secured in some fashion to the backside of the panel so that they are not visible from the interior of the vehicle after the panel assembly is installed. Consequently, it is often incumbent upon the line operators to blindly "feel" for the location of the mounting holes with their fingers before pressing the fasteners into the holes from the opposite show-surface side of the panel.

Due to slight misalignments, which can occur between the fasteners and their corresponding mounting holes, some of the fasteners may not be properly seated and secured to the sheet metal.

Accordingly, there remains a need in the art for an improved fastener having a relatively low installation force and a relatively high removal force that is relatively more tolerant of misalignment problems. Ideally, the fastener should be inexpensive to manufacture, reliable and simple to install. Furthermore, the fastener should be particularly adapted for securing structures to one another in a manner, which minimizes vibration, and the concomitant noise problems that are often associated with such fasteners.

SUMMARY OF THE INVENTION

In one preferred form, the present invention provides a resilient clip for engaging a structure. The resilient clip includes a body portion having a pair of top flanges, a pair of fastening members and a pair of abutting flanges. Each of the fastening members has a base portion that is coupled to an associated top flange. Each of the abutting flanges has a concave surface that engages the mounting structure.

BRIEF DESCRIPTION OF THE DRAWINGS

Additional advantages and features of the present invention will become apparent from the subsequent description and the appended claims, taken in conjunction with the accompanying drawings, wherein:

FIGS. 3b and 3c depict cross-sectional views of the fastener depicted in FIG. 3a;

FIGS. 5b and 5c depict cross-sectional views of the fastener depicted in FIG. 5a;

FIGS. 14b and 14c depict cross-sectional views of the fastener depicted in FIG. 14a;

FIGS. 15b and 15c depict cross-sectional views of the fastener depicted in FIG. 5a;

DETAILED DESCRIPTION OF THE PREFERRED EMBODIMENT

Referring to FIGS. 1 through 8, a generally U-shaped fastener 20 in accordance with the present invention is disclosed. The generally U-shaped fastener 20 is defined by a body portion 22 and a pair of top flanges 24. Integral with the top flanges 24 are two pair of finger members 26 which are used to couple the generally U-shaped fastener 20 to a mounting flange (shown in FIG. 11). Additionally, the body portion 22 has a pair of abutting flanges 28 which generally lie outside side members 29 and 30 of the body portion 22. The side members, which are coupled by a bottom curved member 29 and 30, define a pair of apertures 32 and 33, which allow for the inward compression of the abutting flanges 28.

Figure 1:
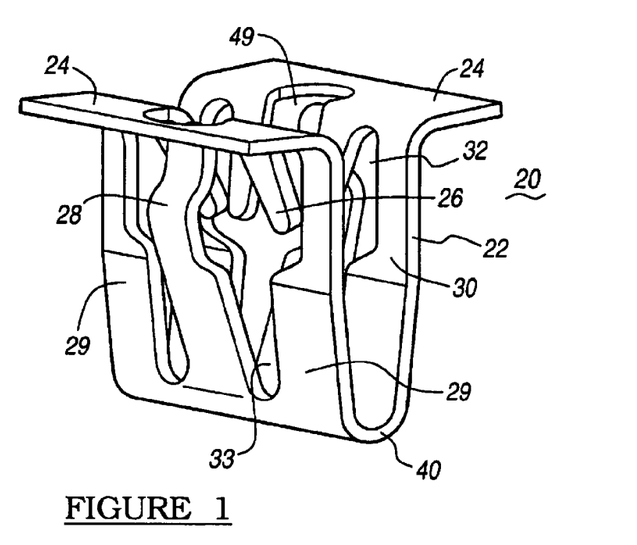
FIG. 1 is a perspective view of a fastener constructed in accordance with the teachings of the present invention.
Figure 2:
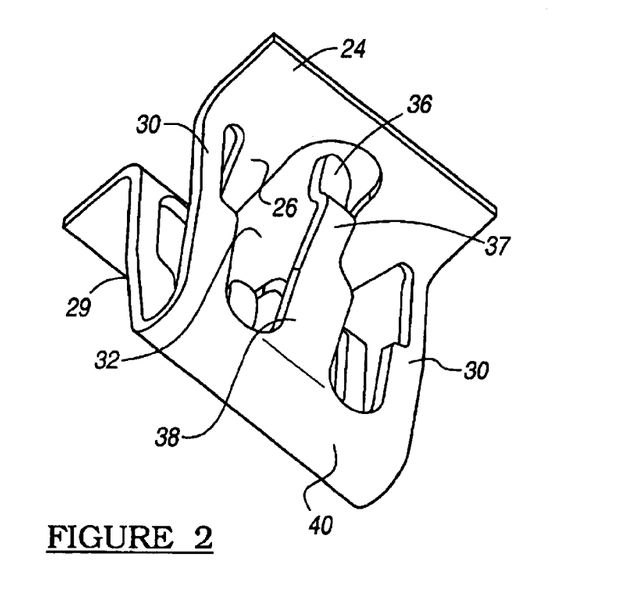
FIG. 2 is a lower perspective view of the fastener of FIG. 1.

Generally, the abutting flanges 28 are defined by three portions. The first portion 36 is defined by an exterior concave engaging surface 50. The second portion 37, which acts as a transition to the third portion 38, is defined by a convex surface. The third portion 38 functions to couple the abutting flange 28 to the base portion 40 of the body 22 of the generally U-shaped fastener 20.

Figure 3A:
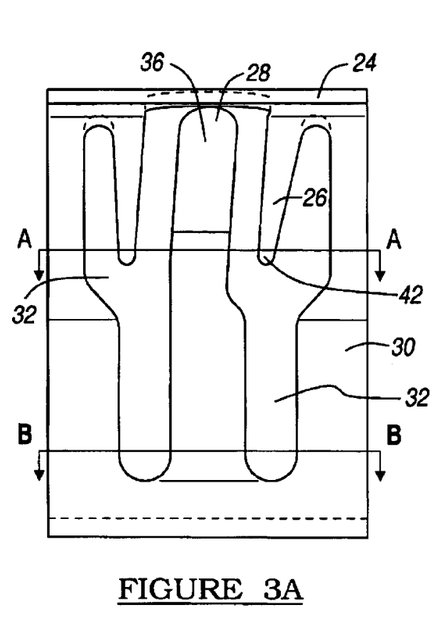
FIG. 3a is a side view of a portion of the fastener of FIG. 1 illustrating the spacing of the structures in greater detail.
Figure 3B:
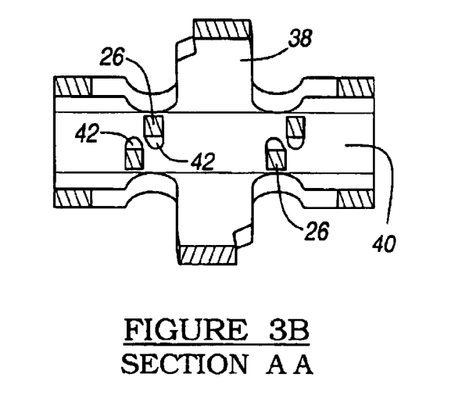
Figure 3C:
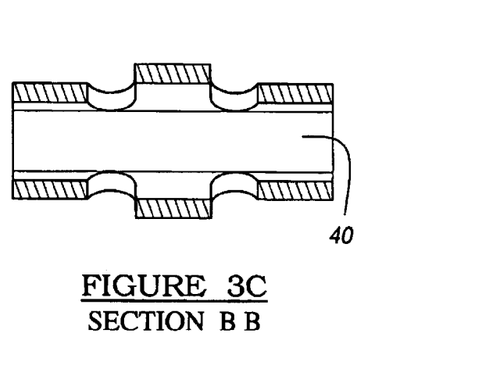
Figure 4:
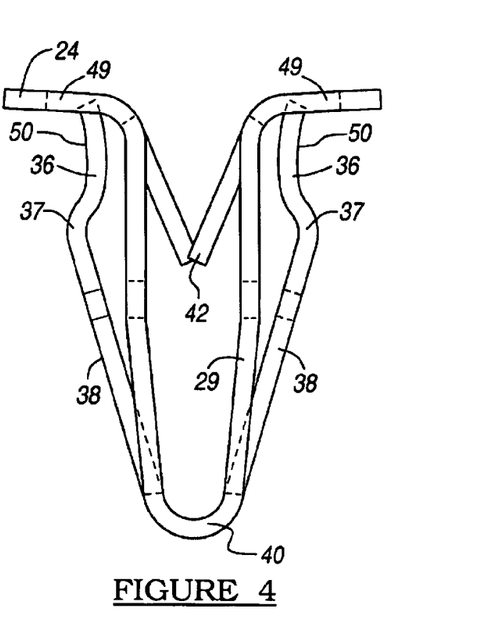
FIG. 4 is a side view of a fastener constructed in accordance with the teachings of the preferred embodiment of the present invention.

FIG. 3a depicts a side view of the generally U-shaped fastener 20 of the current invention. Shown is the relationship of the finger members 26 to the abutting flanges 28, which are formed within the aperture 32. As best seen in FIGS. 3b and 4, the tips 42 of the finger members 26 are angled to frictionally engage a flange member 54 of a trim component 60. FIG. 3b shows the relationship of the third portion 38 to the base member 40 of the body portion 22.

FIG. 4 is a side view of the U-shaped fastener 20 and shows the relationship of the abutting flanges 28 to the body portion 22. As can be seen, the top flanges 24 defines an upper keyhole slot 49 which allow the movement of the abutting flanges 28 when they are compressed. Further depicted is the angular relationship of the side members 29 and 30 of the body portion with respect to the base 40 and the top flanges 24. It must be noted that while the finger member 26 are shown, any suitable fastener is usable. This includes but is not limited to a hole, threaded hole, slots or flanges.

Figure 5A:
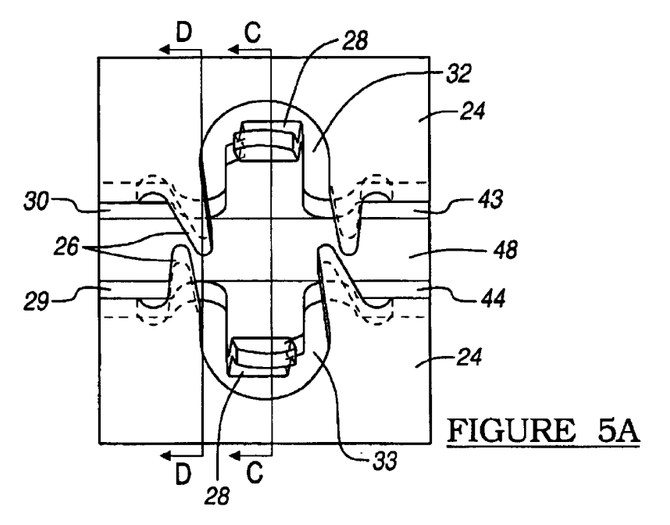
FIG. 5a is a top view of a portion of the fastener of FIG. 1, illustrating the clip structure in greater detail.

FIG. 5a depicts a top view of the generally U-shaped fastener 20. Defined by the side members 29 and 30 is a slot 48 which is used to engage the coupling flange 54 (see FIGS. 9 and 11) of a trim component 60. The exterior concave surface 50 of the abutting flanges 28 are used to engage sheet metal to hold the fastener in place. Also depicted is the interior surface 52 of the finger members 26, which engage the surfaces of the coupling flange 54.

Figure 5B:
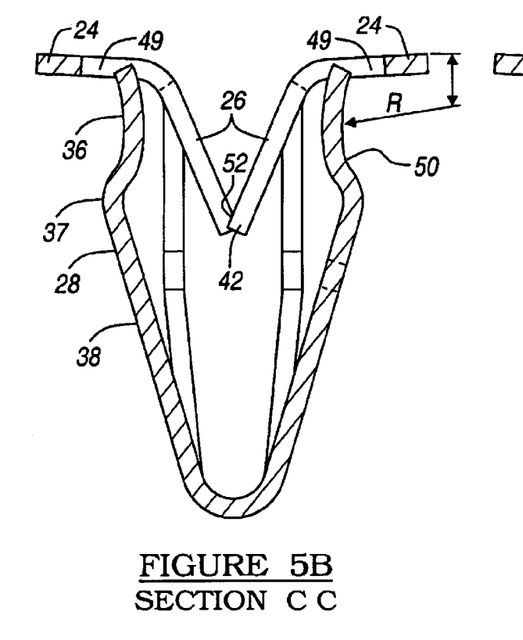
Figure 5C:
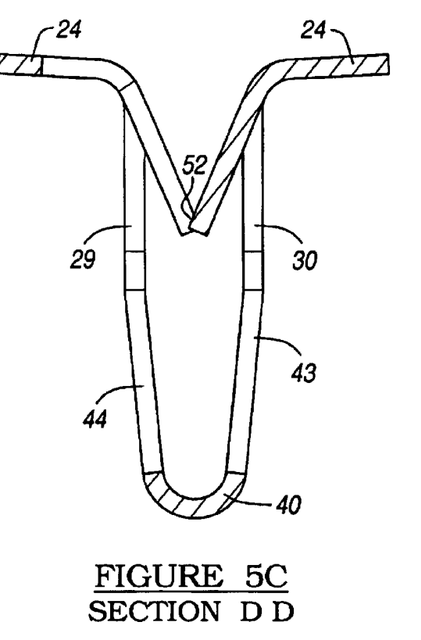

FIG. 5b is a cross-section of the fastener as shown in FIG. 5a. Depicted is the relationship of the abutting flanges 28 with the base member 40. Further, the cross-section details the radius of the exterior concave surface 50. The radius of the concave surface 50 generally can be between 3.5 to 6.0 millimeters and preferably 4.75 millimeters. The center of curvature for the radius R is between 2 and 4 millimeters from the top of the fastener and preferably 2.3 millimeters. FIG. 5c best details the relationship of the finger members 26 to the top flanges 24 and the first and second flange members 43 and 44.

Figure 6:
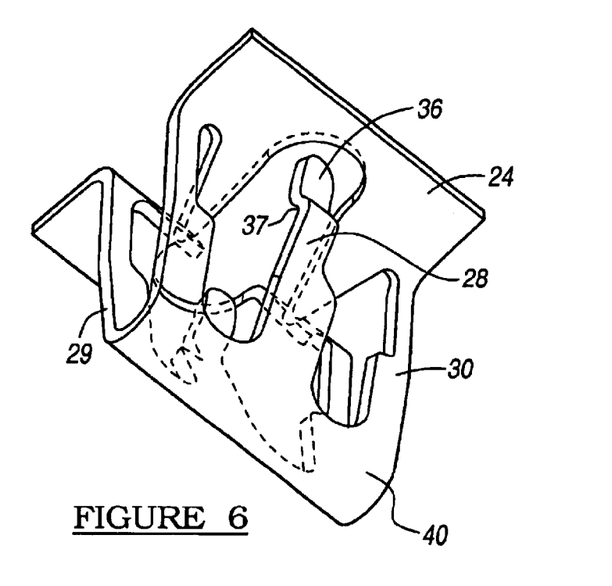
FIG. 6 is a lower perspective view of the fastener of FIG. 1.
Figure 7:
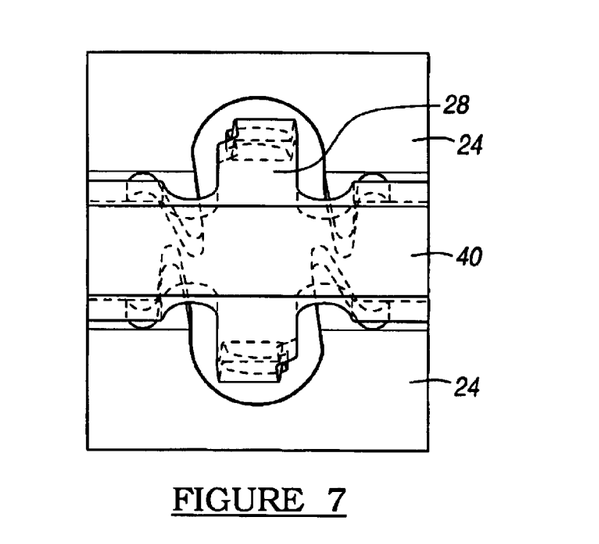
FIG. 7 is a bottom view of the fastener of FIG. 1.
Figure 8:
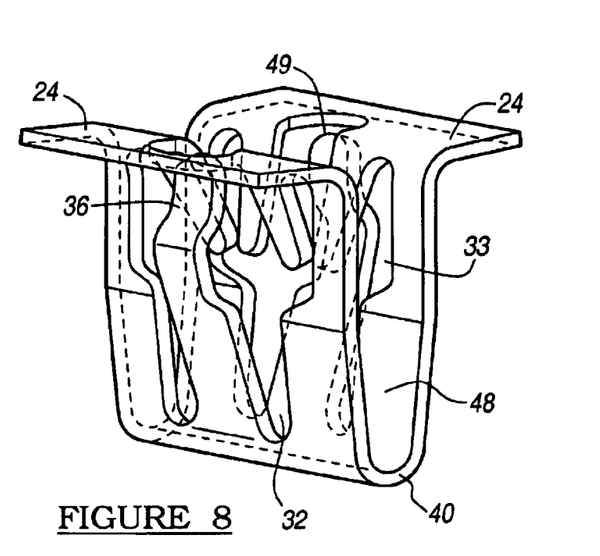
FIG. 8 is a perspective view of the fastener of FIG. 1.

FIGS. 6 through 8 are depictions of the U-shaped fastener 20 of the current invention with hidden components shown in phantom. Depicted is the relationship of the fastener components with various surfaces of the fastener.

Figure 9:
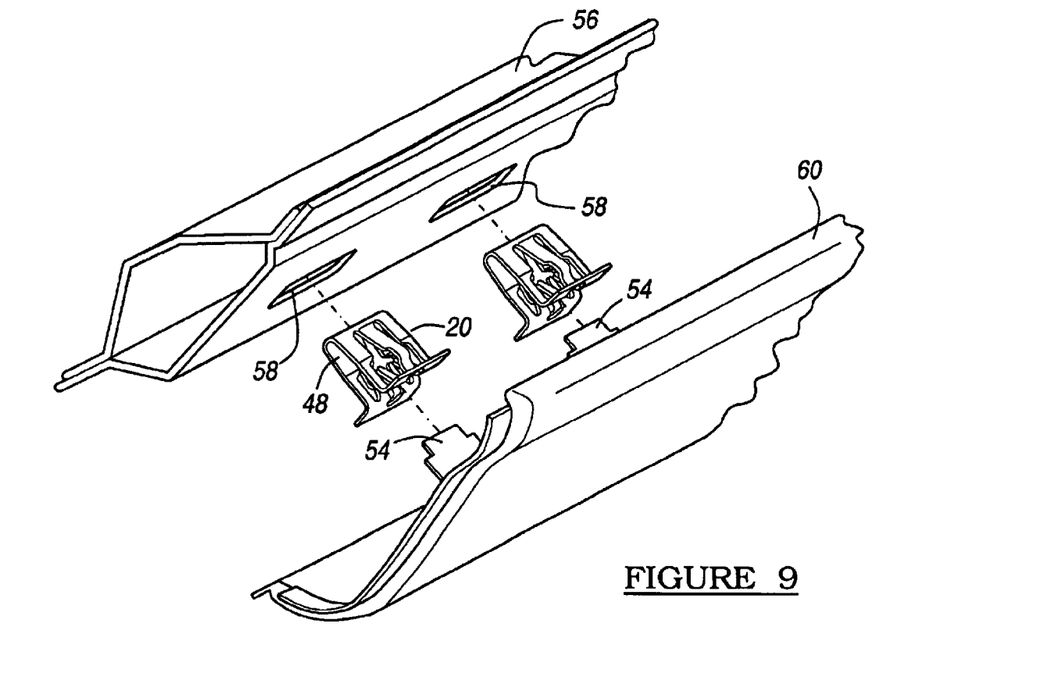
FIG. 9 is an exploded perspective view showing the fastener being used to mount an interior trim component.

FIG. 9 depicts the use of the U-shaped fastener 20 of the current invention. Shown is a sheet metal structure 56, which defines a pair of apertures 58. The apertures 58 are designed to accept the U-shaped fastener 20 to allow for the mating of a trim component 60 to the sheet metal 56. The trim component 60 has a pair of flanges 54, which are inserted, into the slot 48 of the U-shaped fastener 20.

Figure 10A:
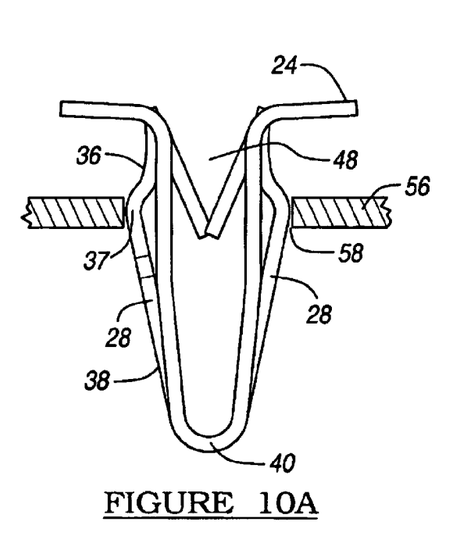
FIGS. 10a and 10b show the insertion of the fastener.
Figure 10B:
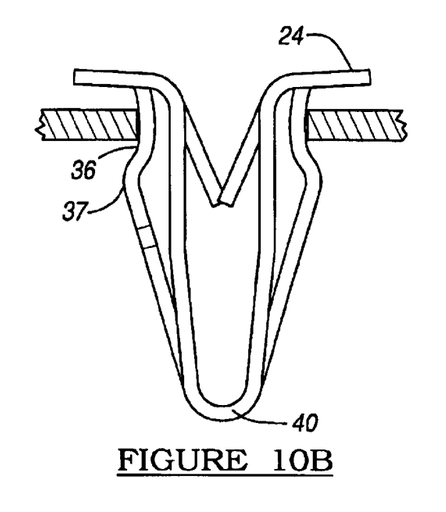

As best seen in FIG. 10, the U-shaped fastener 20 is inserted into the aperture 58 of the sheet metal structure 56. As the fastener 20 is depressed into the aperture 58, the abutting flanges 28 are compressed toward each other and the centerline of the U-shaped fastener 20. This compression of the abutting flanges 28 continues until the sheet metal 56 of the aperture 58 reaches the second portion 37 of the abutting flanges. At this point, a transition occurs and the sheet metal 56 is allowed to engage with the concave surface 56 of the first portion 36 of the abutting flanges 28.

Figure 11:
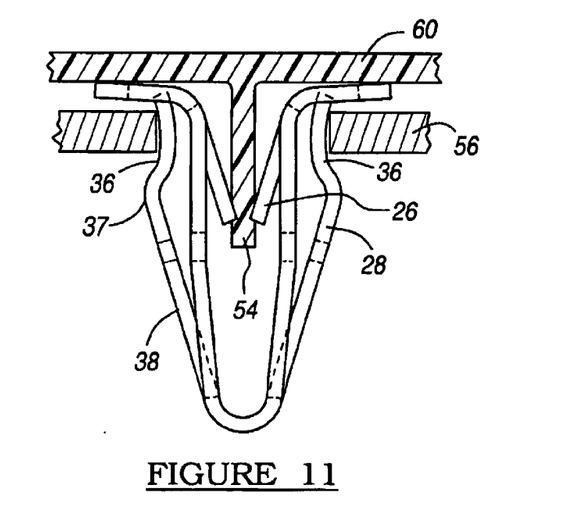
FIG. 11 is a cross-sectional view of the fastener of FIG. 10 with corresponding trim component

FIG. 11 depicts the coupling of the trim component 60 to the U-shaped fastener 20. Shown is the coupling flange 54 inserted between the finger members 26 of the U-shaped fastener 20.

It has been shown that the current fastener 20 is significantly more easy to insert into a sheet metal structure 56 than it is to remove. For example, the fastener as depicted has a required insertion force of about 10 pounds and a removal force of greater than 20 pounds.

Referring to FIGS. 12 through 20, a generally U-shaped fastener 20 in accordance with a second embodiment of the present invention is disclosed. The generally U-shaped fastener 120 is defined by a body portion 122 and a pair of top flanges 124. Integral with the top flanges 124 are two pair of first finger member 126 and a pair of second finger member 127 which are used to couple the generally U-shaped fastener 120 to a mounting flange (shown in FIG. 20). Additionally, the body portion 122 has a pair of abutting flanges 128 which generally lie outside the side members 129 and 130 of the body portion 122. The side members 129 and 130 define a pair of apertures, 132 and 133, which allow for the inward compression of the abutting flanges 128.

Figure 12:
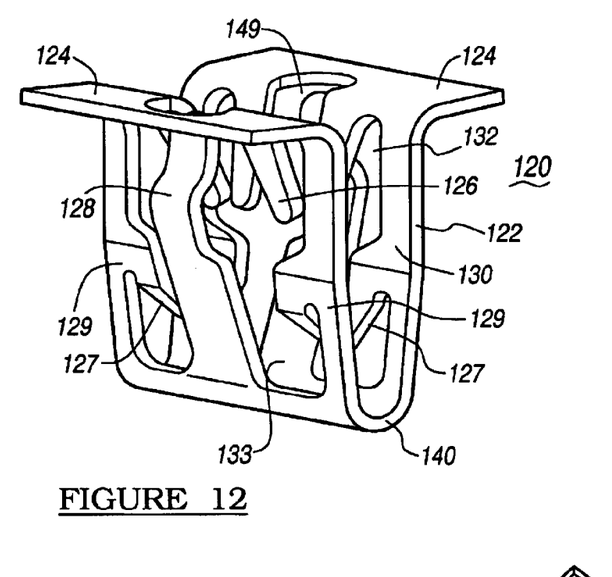
FIG. 12 is a perspective view of a fastener constructed in accordance with the teachings of a second embodiment of the present invention.
Figure 13:
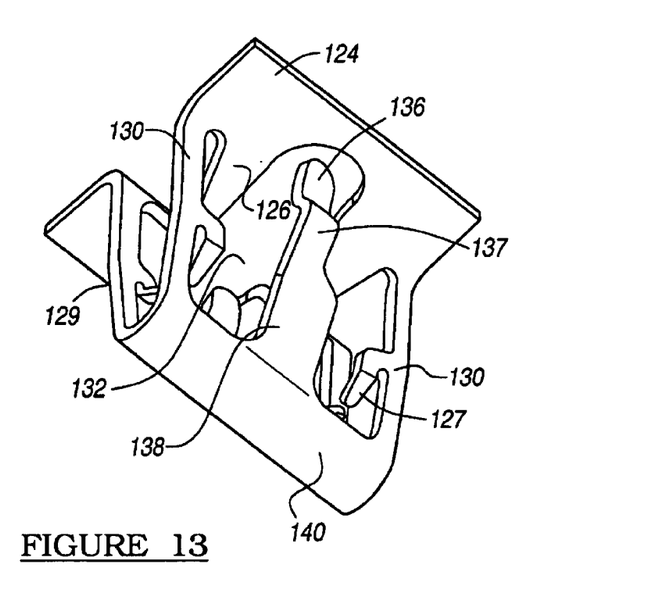
FIG. 13 is a lower perspective view of the fastener of FIG. 12.

Generally, the abutting flanges 128 are defined by three portions. The first portion 136 is defined by an exterior concave engaging surface 150. The second portion 137, which acts as a transition to the third portion 138, is defined by a convex surface. The third portion 138 functions to couple the abutting flange 128 to the base portion 140 of the body 122 of the generally U-shaped fastener 120.

Figure 14A:
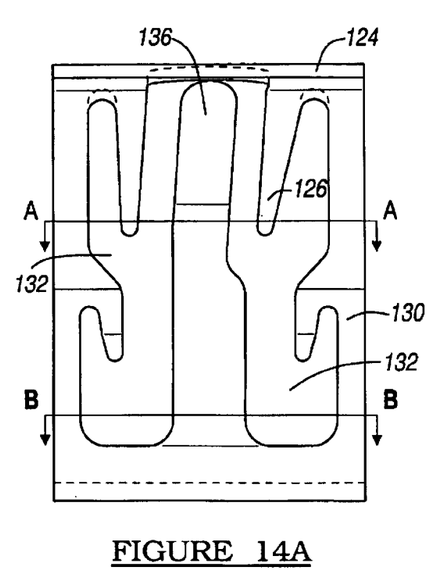
FIG. 14a is a side view of a portion of the fastener of FIG. 13 illustrating the spacing of the structures in greater detail.
Figure 14B:
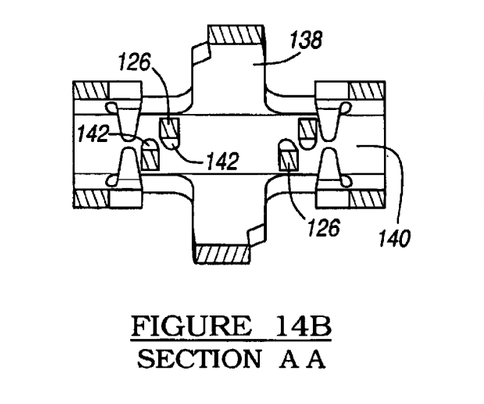
Figure 14C:
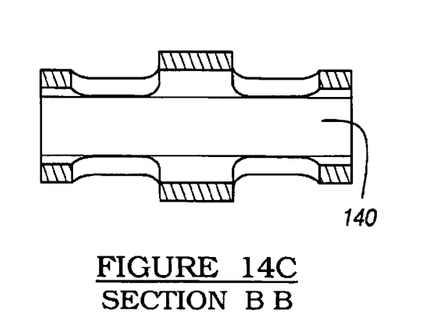
Figure 15:
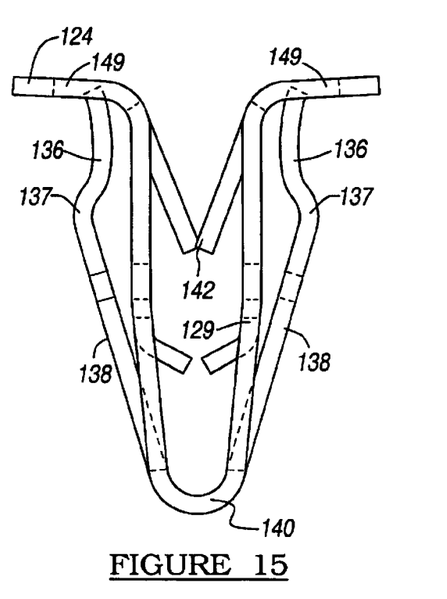
FIG. 15 is a side view of a fastener constructed in accordance with the teachings of the preferred embodiment of the present invention.

FIG. 14a depicts a side view of the generally U-shaped fastener 120 of the second embodiment of the current invention. Shown is the relationship of the first finger member 126 and second finger member 127 to the abutting flanges 128, which are formed within the aperture 132. As best seen in FIGS. 14b and 15, the tips 142 of the first finger member 126 and the tips 143 of the second finger member 127 are angled to frictionally engage a flange member 154 of a trim component 160. The angle of the first finger member 126 can be between about 15° to 25° and preferably about 20°, while the angle of the second finger member 127 can be between about 50° to 60° and preferably about 55°. FIG. 14b shows the relationship of the third portion 138 to the base member 140 of the body portion 122.

FIG. 15 is a side view of the U-shaped fastener 120 and shows the relationship of the abutting flanges 128 to the body portion 122. As can be seen, the top flanges 124 defines an upper keyhole slot 149 which allow the movement of the abutting flanges 128 when they are compressed. Further depicted is the angular relationship of the side members 129 and 130 of the body portion with respect to the base 140 and the top flanges 124. It must be noted that while the finger members 126 and 127 are shown, any suitable fastener is usable. This includes but is not limited to a hole, threaded hole, slots or flanges.

Figure 15A:
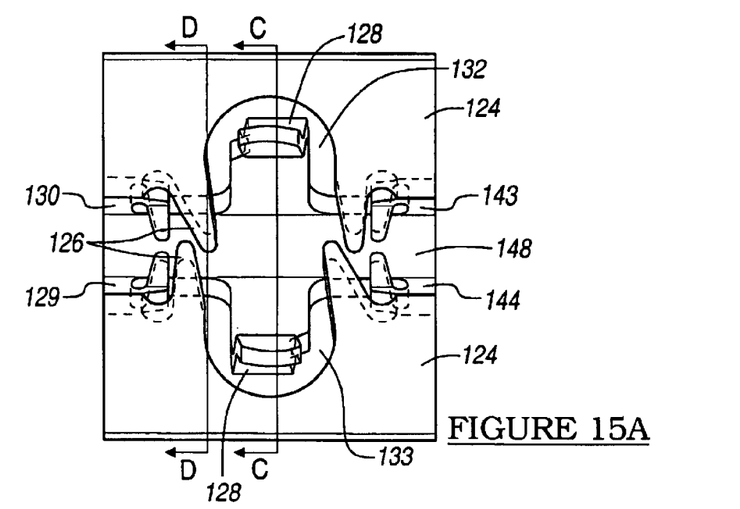
FIG. 15a is a top view of a portion of the fastener of FIGS. 12 and 15, illustrating the clip structure in greater detail.

FIG. 15a depicts a top view of the generally U-shaped fastener 120. Defined by the side members 129 and 130 is a slot 148 which is used to engage the coupling flange 154 (see FIGS. 19 and 21) of a trim component 160. The exterior concave surface 150 of the abutting flanges 128 are used to engage sheet metal to hold the fastener in place. Also depicted is the interior surface 152 of the first and second finger members 126 and 127, which engage the surfaces of the coupling flange 154.

Figure 15B:
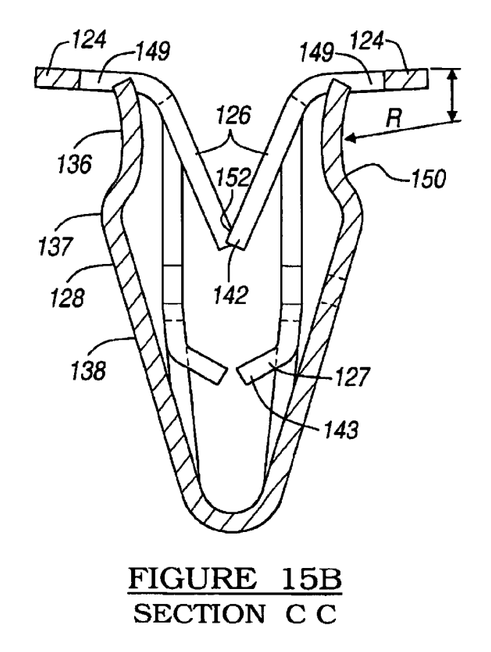
Figure 15C:
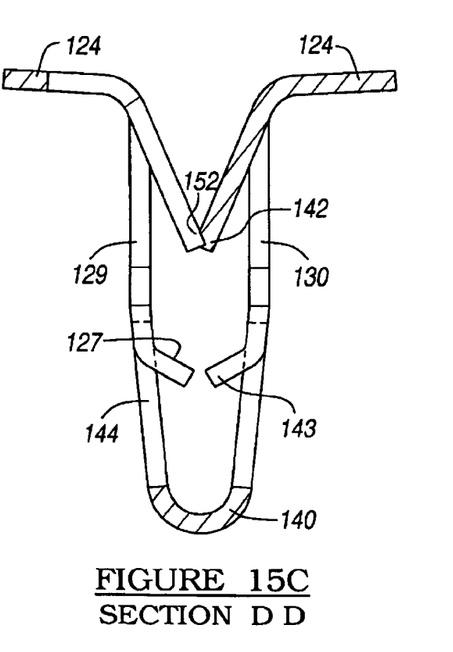

FIG. 15b is a cross-section of the fastener as shown in FIG. 15a. Depicted is the relationship of the abutting flanges 128 with the base member 140. Further, the cross-section details the radius of the exterior concave surface 150. The radius of the concave surface 150 generally can be between 3.5 to 6.0 millimeters and preferably 4.75 millimeters. The center of curvature for the radius R is between 2 and 4 millimeters from the top of the fastener and preferably 2.3 millimeters. FIG. 15c best details the relationship of the first finger member 126 to the top flanges 124 and the first and second flange members 143 and 144.

Figure 16:
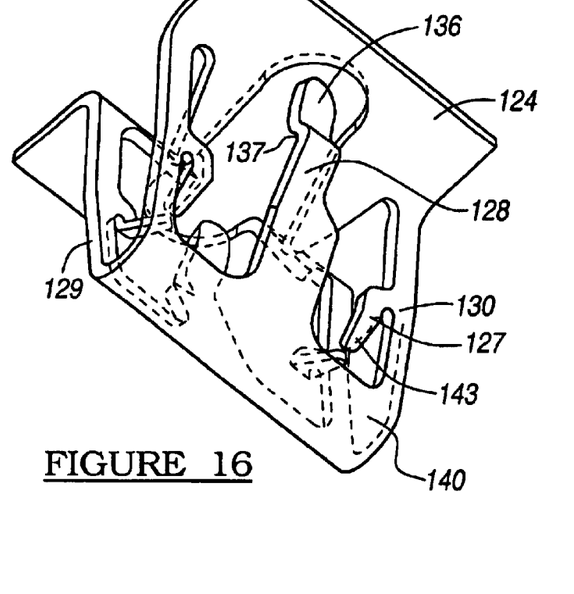
FIG. 16 is a lower perspective view of the fastener of FIG. 12.
Figure 17:
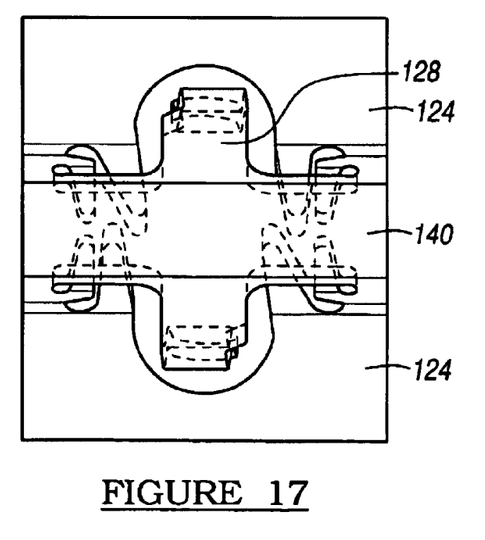
FIG. 17 is a bottom view of the fastener of FIG. 12.
Figure 18:
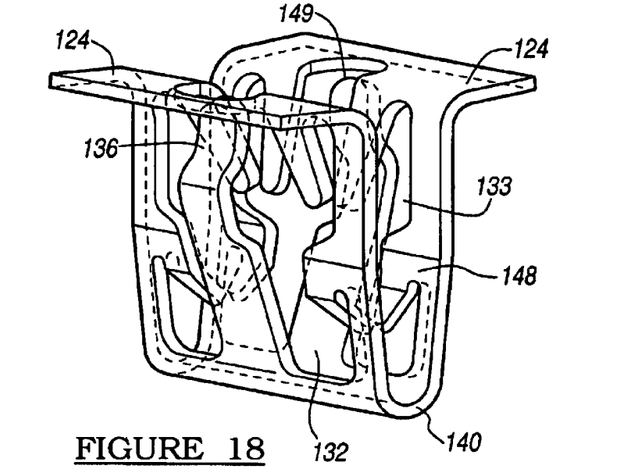
FIG. 18 is a perspective view of the fastener of FIG. 12.

FIGS. 16 through 18 are depictions of the U-shaped fastener 120 of the current invention with hidden components shown in phantom. Depicted is the relationship of the fastener components with various surfaces of the fastener.

Figure 19:
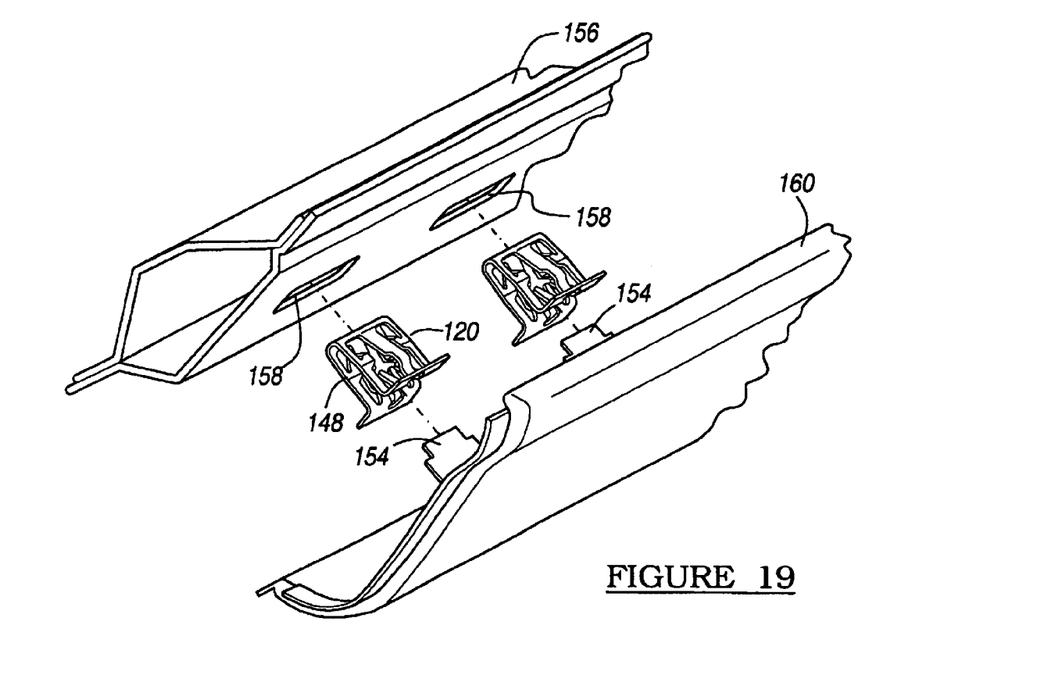
FIG. 19 is an exploded perspective view showing the fastener being used to mount an interior trim component.

FIG. 19 depicts the use of the U-shaped fastener 120 of the current invention. Shown is a sheet metal structure 156, which defines a pair of apertures 158. The apertures 158 are designed to accept the U-shaped fastener 120 to allow for the mating of a trim component 160 to the sheet metal 156. The trim component 160 has a pair of flanges 154, which are inserted, into the slot 148 of the U-shaped fastener 120.

Figure 20A:
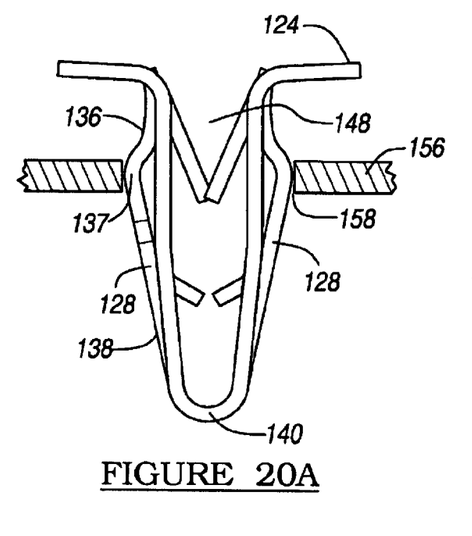
FIGS. 20a and 20b show the insertion of the fastener.
Figure 20B:
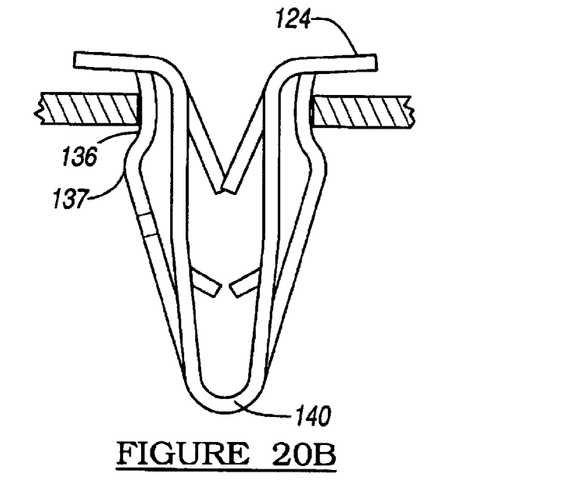

As best seen in FIG. 20A, the U-shaped fastener 120 is inserted into the aperture 158 of the sheet metal structure 156. As the fastener 120 is depressed into the aperture 158, the abutting flanges 128 are compressed toward each other and the centerline of the U-shaped fastener 120. This compression of the abutting flanges 128 continues until the sheet metal 156 of the aperture 158 reaches the second portion 137 of the abutting flanges. At this point, a transition occurs and the sheet metal 156 is allowed to engage with the concave surface 156 of the first portion 136 of the abutting flanges 128.

Figure 21:
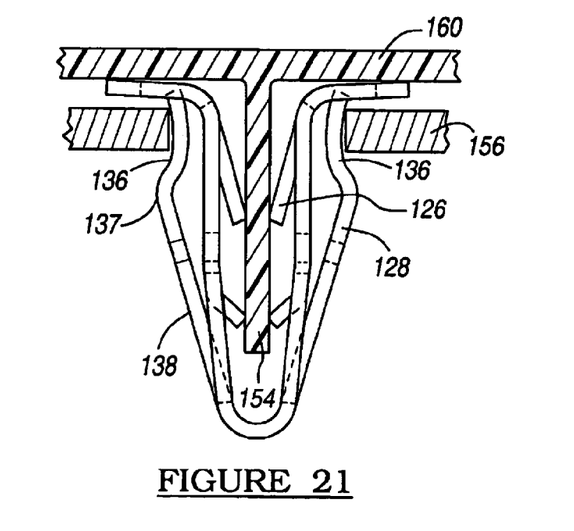
FIG. 21 is a cross-sectional view of the fastener of FIG. 18 with corresponding trim component

FIG. 21 depicts the coupling of the trim component 160 to the U-shaped fastener 120. Shown is the coupling flange 154 inserted between the first and second finger members 126 and 127 of the U-shaped fastener 120.

It has been shown that the current fastener 120 is significantly more easy to insert into a sheet metal structure 156 than it is to remove. For example, the fastener as depicted has a required insertion force of about 10 pounds and a removal force of greater than 20 pounds.

The foregoing discussion discloses and describes exemplary embodiments of the present invention. One skilled in the art will readily recognize from such a discussion, and from the accompanying drawings and claims that various changes, modifications, and variations can be made therein without departing from the spirit and scope of the invention.

What is claimed is:

1. A generally U-shaped fastener adapted to mount an object to a panel, the panel including a mounting aperture therein, the fastener comprising:
    a body portion having a pair of side members coupled to each other by a curved base portion at an insertion end of the generally U-shaped fastener, the pair of side members defining a slot between the pair of side members, the slot being adapted to receive a coupling member from the object;
    a flange member extending outwardly from each of the pair of side members near an end opposite the insertion end of the generally U-shaped fastener, each flange member being adapted to contact a surrounding portion of the mounting aperture;
    a plurality of finger members extending inwardly into the slot at an angle into the slot from each of the pair of side members or from the flange members, the plurality of finger members being adapted to grasp the coupling member of the object upon the coupling member being inserted into the slot; and
    at least one abutting flange extending outwardly from each of the pair of side members, each of the at least one abutting flange having a generally straight portion, a transition portion and an engaging portion, the generally straight portion coupling the at least one abutting flange to one of the side members near the insertion end of generally U-shaped fastener, the transition portion being coupled to the generally straight portion and being defined by an exterior convex surface, the engaging portion having an exterior concave surface immediately abutting the exterior convex surface of the transition portion and extending continuously from the transition portion, the exterior concave engaging surface having a radius between 3.5 millimeters and 6.0 millimeters and being adapted to engage an edge of the mounting aperture upon insertion therein to retain the generally U-shaped fastener in the mounting aperture.

2. A generally U-shaped fastener according to claim 1, wherein an exterior surface of the abutting flange member extending from the transition portion to a distal end of the abutting flange consists essentially of the concave engaging surface.

3. A generally U-shaped fastener according to claim 2, wherein the radius of the exterior concave engaging surface is 4.75 millimeters.

4. A generally U-shaped fastener according to claim 1, wherein the center of curvature for the radius is between 2 millimeters and 4 millimeters from the end opposite the insertion end of the generally U-shaped fastener.

5. A generally U-shaped fastener according to claim 4, wherein the center of curvature for the radius is 2.3 millimeters from the end opposite the insertion end of the generally U-shaped fastener.

6. A generally U-shaped fastener according to claim 1, wherein the force required to insert the generally U-shaped fastener into the mounting aperture to enable the exterior concave engaging surface to engage an edge of the mounting aperture is about 10 pounds.

7. A generally U-shaped fastener according to claim 6, wherein the force required to remove the generally U-shaped fastener from the mounting aperture after the exterior concave engaging surface has engaged an edge of the mounting aperture is at least 20 pounds.

8. A generally U-shaped fastener according to claim 1, wherein an opening in the flange member allows the at least one abutting flange to move inwardly into the opening without contacting the flange member.

9. A generally U-shaped fastener according to claim 1, wherein the generally U-shaped fastener is formed from a sheet of material.

10. A generally U-shaped fastener according to claim 2, wherein the angle is between about 15 degrees and about 25 degrees.

11. A generally U-shaped fastener according to claim 10, wherein the plurality of finger members extend inwardly into the slot at an angle of about 20 degrees.

12. A generally U-shaped fastener formed from a sheet of material and adapted to mount an object to a panel, the panel including a mounting aperture therein, the fastener comprising:

a body portion bent at a curved bass portion defining an insertion end of the generally U-shaped fastener and having a pair of side members extending from the curved base portion, the pair of side members defining a slot between the pair of side members, the slot being adapted to receive a coupling member from the object;

a flange member bent to extend outwardly from each of the pair of side members near an end opposite the insertion end of the generally U-shaped fastener, each flange member being adapted to contact a surrounding portion of the mounting aperture;

a plurality of finger members bent to extend inwardly into the slot from each of the pair of side members or from the flange member, each of the plurality of finger members extending inwardly at an angle into the slot from each of the pair of side members or from the flange member, the plurality of finger members being adapted to grasp the coupling member of the object upon the coupling member being inserted into the slot; and at least one abutting flange bent to extend outwardly from each of the pair of side members, each of the at least one abutting flange having a generally straight portion, a transition portion and an engaging portion, the generally straight portion being bent to extend from one of the side members near the insertion end of generally U-shaped fastener, the transition portion being bent to extend from the generally straight portion and being bent to define an exterior convex surface, the engaging portion being bent to extend from the transition portion and being bent to define an exterior concave surface immediately abutting the exterior convex surface of the transition portion and extending continuously from the exterior convex surface, the exterior concave engaging surface having a radius between 3.5 millimeters and 6.0 millimeters and being adapted to engage an edge of the mounting aperture upon insertion therein to retain the generally U-shaped fastener in the mounting aperture.

13. A generally U-shaped fastener according to claim 12, wherein an exterior surface of the abutting flange member extending from the transition portion to a distal end of the abutting flange consists essentially of the concave engaging surface.

14. A generally U-shaped fastener according to claim 13, wherein an opening in the flange member allows the at least one abutting flange to move inwardly into the opening without contacting the flange member.

15. A generally U-shaped fastener according to claim 14, wherein the force required to insert the generally U-shaped fastener into the mounting aperture to enable the exterior concave engaging surface to engage an edge of the mounting aperture is about 10 pounds.

16. A generally U-shaped fastener according to claim 15, wherein the force required to remove the generally U-shaped fastener from the mounting aperture after the exterior concave engaging surface has engaged an edge of the mounting aperture is at least 20 pounds.

17. A generally U-shaped fastener according to claim 16, wherein the center of curvature for the radius is between 2 millimeters and 4 millimeters from the end opposite the insertion end of the generally U-shaped fastener.

18. A generally U-shaped fastener according to claim 12, wherein the angle is between about 15 degrees and about 25 degrees.

19. A generally U-shaped fastener according to claim 18, wherein the plurality of finger members extend inwardly into the slot at an angle of about 20 degrees.

20. A generally U-shaped fastener according to claim 19, wherein the center of curvature for the radius is 2.3 millimeters from the end opposite the insertion end of the generally U-shaped fastener.

\* \* \* \* \*